(12) United States Patent
Ogiwara et al.

(10) Patent No.: US 7,772,331 B2
(45) Date of Patent: Aug. 10, 2010

(54) METHOD OF PRODUCING LOW VISCOSITY PHENOL-MODIFIED AROMATIC HYDROCARBON FORMALDEHYDE RESIN

(75) Inventors: Masashi Ogiwara, Okayama (JP); Seiji Kita, Okayama (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 11/697,315

(22) Filed: Apr. 6, 2007

(65) Prior Publication Data

US 2007/0238850 A1  Oct. 11, 2007

(30) Foreign Application Priority Data

Apr. 7, 2006 (JP) .............................. 2006-106287

(51) Int. Cl.
- *C08G 4/00* (2006.01)
- *C08G 10/04* (2006.01)
- *C08G 14/02* (2006.01)
- *C08G 16/04* (2006.01)
- *C08G 8/04* (2006.01)
- *C08L 61/20* (2006.01)

(52) U.S. Cl. ...................................... 525/472; 528/129
(58) Field of Classification Search ................. 524/129; 525/472; 528/129
See application file for complete search history.

(56) References Cited

U.S. PATENT DOCUMENTS

| | | | | |
|---|---|---|---|---|
| 2,597,159 A * | 5/1952 | May et al. | .................... | 528/144 |
| 3,303,167 A * | 2/1967 | Hideo et al. | ................. | 528/242 |
| 3,380,954 A * | 4/1968 | Wesselhoft et al. | .......... | 524/423 |
| 3,394,203 A * | 7/1968 | Winegartner et al. | ........ | 525/492 |
| 3,398,107 A * | 8/1968 | Rowe, Jr. et al. | ............ | 524/313 |
| 4,055,546 A * | 10/1977 | Chu et al. | .................... | 525/480 |
| 4,187,369 A * | 2/1980 | Pavlikov et al. | ............. | 528/137 |
| 4,276,408 A * | 6/1981 | Robinson et al. | ............ | 528/247 |
| 4,689,392 A * | 8/1987 | Miyamoto et al. | ........... | 528/247 |
| 5,089,589 A * | 2/1992 | Hesse et al. | .................. | 528/129 |
| 5,596,040 A * | 1/1997 | Miya et al. | ................. | 525/92 B |
| 5,714,544 A * | 2/1998 | Ohya et al. | .................. | 525/154 |
| 5,792,826 A * | 8/1998 | Tashima et al. | ............. | 528/160 |
| 5,939,511 A * | 8/1999 | Zampini et al. | ............. | 528/143 |
| 5,986,035 A * | 11/1999 | Inagaki et al. | ............... | 528/129 |
| 6,417,316 B1 * | 7/2002 | Wiesendanger et al. | ....... | 528/92 |
| 6,642,345 B2 * | 11/2003 | Yuasa et al. | ................. | 528/129 |
| 6,664,433 B1 * | 12/2003 | Senzaki et al. | ............. | 585/864 |
| 6,713,591 B1 * | 3/2004 | Senzaki et al. | ............. | 528/129 |
| 2004/0014930 A1 * | 1/2004 | Senzaki et al. | ................ | 528/86 |
| 2004/0242834 A1 * | 12/2004 | Ueno | .......................... | 528/87 |

FOREIGN PATENT DOCUMENTS

JP    2003-119234    4/2003

OTHER PUBLICATIONS

Machine Translation of JP-2003-11923A (cited on IDS).*

* cited by examiner

*Primary Examiner*—Mark Eashoo
*Assistant Examiner*—Liam J Heincer
(74) *Attorney, Agent, or Firm*—Antonelli, Terry, Stout & Kraus, LLP.

(57) ABSTRACT

Provided is a method of producing a low viscosity phenol-modified aromatic hydrocarbon formaldehyde resin (C), including subjecting an aromatic hydrocarbon formaldehyde resin (A) and a phenol (B) to condensation reaction under the presence of an acid catalyst. The method includes: terminating, when a reaction mixture has a viscosity at 25° C. of 200 to 1,500 mPa·S, the condensation reaction by adding an inorganic basic compound and/or a tertiary amine compound having a boiling point of 300° C. or more; and distilling and removing the phenol (B) unreacted and a low boiling component after termination of the condensation reaction, whereby there can be produced a low viscosity phenol-modified aromatic hydrocarbon formaldehyde resin which is kept in a liquid state and contains small amounts of unreacted phenols, and in which increase in viscosity is small even after removal of low boiling components.

8 Claims, No Drawings

METHOD OF PRODUCING LOW VISCOSITY PHENOL-MODIFIED AROMATIC HYDROCARBON FORMALDEHYDE RESIN

TECHNICAL FIELD

The present invention relates to a method of producing a low viscosity phenol-modified aromatic hydrocarbon formaldehyde resin containing a specific amount or more of skeletons of phenols therein.

BACKGROUND ART

Aromatic hydrocarbon formaldehyde resins are obtained by reaction between aromatic hydrocarbons and formalin under the presence of acid catalysts, and have excellent compatibility to various natural resins and synthetic resins. Thus, the aromatic hydrocarbon formaldehyde resins are mixed with the various natural resins and synthetic resins as main resins for improving adhesion property, humidity resistance, and electrical characteristics of the main resins. Further, the aromatic hydrocarbon formaldehyde resins can be used after being modified with phenols to additionally improve the properties.

Many of conventional phenol-modified aromatic hydrocarbon formaldehyde resins are solid or have high viscosity. As a method of improving operability of the resins, there is used a method of subjecting the resins to dilution treatment with organic solvents. However, the method has problems in that an additionally large apparatus is required in the dilution treatment with the organic solvents, use of the solvents tends to be strictly restricted from a viewpoint of environmental problems, and the like. Accordingly, there is a demand for a phenol-modified aromatic hydrocarbon formaldehyde resin which has low viscosity and requires no dilution treatment with the organic solvents.

As a method of obtaining a low viscosity phenol-modified aromatic hydrocarbon formaldehyde resin, there is a method involving reaction in a reaction system having excessive amounts of phenols, but the method is not preferable because large amounts of unreacted phenols remain in the resultant resin. Further, even when the unreacted phenols are removed therefrom, the resin is semi-solid at room temperature, resulting in a problem in operability of the resin.

In Patent Document 1, for example, there is disclosed modification of an aromatic hydrocarbon formaldehyde resin with small amounts of phenols by using as a weak acid catalyst an amine salt of para-toluene sulfonic acid. However, in a case where unreacted phenols and unreacted low boiling components are distilled and removed by a distillation operation for ameliorating loss on heating, the reaction proceeds even during the distillation operation and the viscosity of the resin increases. Further, in a case where collected unreacted phenols and unreacted low boiling components are returned to the reaction system, there arises a problem in that components derived from the amine of the amine salt of para-toluene sulfonic acid act as a reaction terminator, so a circulating type production cycle cannot be established.

Patent Document 1: Japanese Patent Application Laid-Open No. 2003-119234

DISCLOSURE OF THE INVENTION

Problem to be Solved by the Invention

It is an object of the present invention to provide a method of producing a low viscosity liquid phenol-modified aromatic hydrocarbon formaldehyde resin, which can ameliorate the above-mentioned problems of the conventional low viscosity phenol-modified aromatic hydrocarbon formaldehyde resins.

Means for Solving the Problems

The inventors of the present invention have made extensive studies to solve the above-mentioned problems. As a result, the inventors of the present invention have found that a low viscosity phenol-modified aromatic hydrocarbon formaldehyde resin which is kept in a liquid state and contains small amounts of unreacted phenols, and in which increase in viscosity is small even after removal of low boiling components can be obtained by using an aromatic hydrocarbon formaldehyde resin and adding thereto a basic compound and/or a tertiary amine compound having a boiling point of 300° C. or more to terminate condensation reaction, and thus the present invention has been achieved.

That is, according to the present invention, there is provided a method of producing a low viscosity phenol-modified aromatic hydrocarbon formaldehyde resin, including subjecting an aromatic hydrocarbon formaldehyde resin (A) and a phenol (B) to condensation reaction under the presence of an acid catalyst to obtain a low viscosity phenol-modified aromatic hydrocarbon formaldehyde rein (C), the method including the steps of: terminating, when a reaction mixture has a viscosity at 25° C. of 200 to 1,500 mPa·S, the condensation reaction by adding an inorganic basic compound and/or a tertiary amine compound having a boiling point of 300° C. or more; and distilling and removing the phenol (B) unreacted and a low boiling component after termination of the condensation reaction.

EFFECTS OF THE INVENTION

According to the production method of the present invention, there can be obtained a low viscosity phenol-modified aromatic hydrocarbon formaldehyde resin which is kept in a liquid state and contains small amounts of unreacted phenols, and in which increase in viscosity is small even after removal of low boiling components.

The low viscosity aromatic hydrocarbon formaldehyde resin obtained by the present invention contains a phenolic hydroxyl group, has a low viscosity, has excellent compatibility with an epoxy resin, a curing agent thereof, and a urethane resin, and exhibits excellent anticorrosive property and excellent surface smoothness when used as an additive for an epoxy resin-based heavy duty coating.

BEST MODE FOR CARRYING OUT THE INVENTION

The aromatic hydrocarbon formaldehyde resin (A) is generally obtained by subjecting an aromatic hydrocarbon such as metaxylene or mesitylene to reaction with formalin under the presence of an acid catalyst under reflux for 2 to 8 hours. An aromatic hydrocarbon formaldehyde resin obtained by using xylene is referred to as a xylene formaldehyde resin, and that obtained by using mesitylene is referred to as a mesitylene formaldehyde resin. Examples of raw materials for the aromatic hydrocarbon formaldehyde resin (A) to be used in the present invention include toluene, 3 isomers of xylene, mesitylene, pseudocumene, a monocyclic aromatic hydrocarbon compound having 10 or more carbon atoms, and a polycyclic aromatic hydrocarbon compound such as naphthalene or methylnaphthalene. Note that a mixture of two or more of the aromatic hydrocarbons can be used.

The aromatic hydrocarbon formaldehyde resin (A) to be used in the present invention has a viscosity at 25° C. of preferably 30 to 500 mPa·S, and more preferably 50 to 200 mPa·S. The aromatic hydrocarbon formaldehyde resin having a relatively low viscosity as described above can be synthesized by, as described in Japanese Patent Application Laid-Open No. 10-168147, subjecting an aromatic hydrocarbon and formaldehyde to reaction with an addition of alcohols such as methanol under the presence of a strong acid catalyst such as sulfuric acid.

The aromatic hydrocarbon formaldehyde resin (A) is mainly composed of a compound which has 1 to 8 of aromatic nuclei (1 to 8 nuclides) in which the aromatic nuclei have a methylene bond, a dimethylene-ether bond, and an acetal bond therebetween, and an aromatic nucleus at the end of its molecule has a methylol group, an acetal group, and a methoxymethyl group. The aromatic hydrocarbon formaldehyde resin (A) is known to react with a compound having a hydroxyl group, a carboxyl group, or the like, such as a phenol or a third component such as an aliphatic or aromatic carboxylic acid. In the present invention, the aromatic hydrocarbon formaldehyde resin (A) is reacted with the phenol (B) to obtain the phenol-modified aromatic hydrocarbon formaldehyde resin (C).

Examples of the phenols (B) to be used in the present invention include phenol, cresols, xylenols, butylphenol, octylphenol, nonylphenol, cardanol, and terpene phenol, with phenol being preferable. One of the phenols (B) may be used alone, or a mixture of two or more of them.

Examples of the acid catalyst to be used in the present invention include sulfuric acid, hydrochloric acid, para-toluene sulfonic acid, and oxalic acid, with para-toluene sulfonic acid being preferable. When the aromatic hydrocarbon formaldehyde resin (A) is a xylene formaldehyde resin or a mesitylene formaldehyde resin, para-toluene sulfonic acid is added in an amount of preferably 5 to 50 ppm, and more preferably 10 to 30 ppm with respect to a total amount of the aromatic hydrocarbon formaldehyde resin (A) and the phenol (B). An amount of less than 5 ppm is not preferable because the reaction proceeds slowly, and an amount exceeding 50 ppm is not preferable because the reaction proceeds locally, resulting in gelation. When the aromatic hydrocarbon formaldehyde resin (A) is a toluene formaldehyde resin, para-toluene sulfonic acid is added in an amount of preferably 50 to 500 ppm, and more preferably 100 to 300 ppm with respect to the total amount of the toluene formaldehyde resin and the phenol (B). An amount of less than 50 ppm is not preferable because the reaction proceeds slowly, and an amount exceeding 500 ppm is not preferable from an economical viewpoint because it does not affect the promotion of the reaction.

A blending ratio between the aromatic hydrocarbon formaldehyde resin (A) and the phenol (B) is preferably 95:5 to 60:40, and more preferably 90:10 to 70:30 in terms of weight ratio. When the blending ratio of the phenol (B) is too large, the amount of an unreacted phenol (B) increases and a large burden is applied to the distillation operation. In addition, a small amount of the phenol (B) is not preferable because the anticorrosive property and adhesion strength in coating application decrease and an effect of phenol modification decreases.

A reaction temperature and a reaction time vary depending on the kind of the phenol (B) to be used and the kind and amount of the acid catalyst, but it is preferable that the reaction temperature be about 120 to 200° C. and the reaction time be about 1 to 6 hours. When phenol is used as the phenol (B), it is preferable that the reaction temperature be about 160 to 180° C. and the reaction time be about 1 to 3 hours.

Timing at which the condensation reaction is terminated can be determined by measuring a viscosity of a reaction mixture or a content of the unreacted phenols in the reaction mixture. The timing at which the condensation reaction is terminated is preferably determined by measuring the viscosity of the reaction mixture. When the condensation reaction is to be terminated, the reaction mixture has a viscosity at 25° C. of 200 to 1,500 mPa·S, and preferably 400 to 1,000 mPa·S. The viscosity exceeding 1,500 mPa·S is not preferable because a high viscosity is imparted to a product obtained after distillation, so smoothness in the coating application is deteriorated. The viscosity of less than 200 mPa·S is not preferable because of insufficient reaction.

In the step of terminating the reaction, an inorganic basic compound or a tertiary amine compound is preferably used as the basic compound to be added as the reaction terminator. Examples of the inorganic basic compound include sodium hydroxide, sodium carbonate, potassium hydroxide, and calcium hydroxide. Since a tertiary amine compound having a low boiling point is distilled out in the distillation operation, a tertiary amine compound having a boiling point of 300° C. or more is used as the tertiary amine compound to be used in the present invention, and triethanol amine is particularly preferable.

The inorganic basic compound or the tertiary amine compound is added in an amount of preferably 1 to 5 times in molar quantity, and more preferably 2 to 3 times in molar quantity with respect to the amount of the acid catalyst to be used.

The inorganic basic compound is preferably added in a form of an aqueous solution or an alcohol solution. The tertiary amine compound is preferably added directly.

The content of the unreacted phenol (B) when the condensation reaction is terminated is preferably 2 to 5% by weight.

The basic compound is added to terminate the condensation reaction, and after the termination of the condensation reaction, a step of distilling and removing the unreacted phenol (B) and low boiling components is performed, whereby the content of the unreacted phenol (B) in the phenol-modified aromatic hydrocarbon formaldehyde resin (C) can be reduced. It is preferable that the content of the unreacted phenol (B) be 0.5% by weight or less.

As a method of distilling and removing the unreacted phenol (B) and the low boiling components, there may be adopted a method of distilling and removing them under vacuum of about 1.3 to 4 kPa (10 to 30 Torr), or a method of distilling and removing them by steam distillation. The method of distilling and removing them under vacuum is preferable. The thus-collected low boiling components contain substances having reactive functional groups, and the collected unreacted phenol (B) and low boiling components can be reused as a part of a reaction raw material. By the above-mentioned method, waste water treatment can be relieved and a basic unit can be improved.

The low viscosity phenol-modified aromatic hydrocarbon formaldehyde resin (C) obtained by the present invention can be controlled to have a viscosity at 25° C. of 1,500 to 10,000 mPa·S after the unreacted phenol (B) and the low boiling components are distilled and removed by controlling the viscosity of the reaction mixture at the time when the condensation reaction is to be terminated.

EXAMPLES

Hereinafter, the present invention will be described in detail by referring to examples. Note that the term "%" denotes "% by weight" unless otherwise stated. Methods of evaluating the low viscosity phenol-modified aromatic hydrocarbon formaldehyde resin are described hereinbelow.

(1) Viscosity

The viscosity at 25° C. was measured by using a TV20 type cone-plate viscometer.

(2) Content of Unreacted Phenol 2 g of a sample was collected and dissolved in 20 ml of acetone, and the mixture was added with 0.1 g of methyl benzoate as an inner standard sample to prepare a sample for analysis. 0.5 µml of the sample for analysis was subjected to measurement by an inner standard method at a column temperature of gas chromatography of 120° C.

Example 1

A 2-L separable flask equipped with a thermometer, a Liebig condenser, a stirrer, and a nitrogen introduction tube was added with 850 g of a xylene formaldehyde resin (NIKANOL (trade name) Y100, manufactured by mitsubishi Gas Chemical Company, Inc.) having a viscosity at 25° C. of 100 mPa·S, 150 g of phenol (special grade, manufactured by Wako Pure Chemical Industries, Ltd.), and 2.4 ml of a 0.5% aqueous solution of para-toluene sulfonic acid (special grade, manufactured by Wako Pure Chemical Industries, Ltd.) (12 ppm with respect to a total amount of the xylene formaldehyde resin and phenol). Reaction was allowed to proceed for 2 hours at 165° C. under a nitrogen flow, and the viscosity at 25° C. of the reaction mixture was measured to be 650 mPa·S. The reaction mixture was added with 1.4 ml of a 0.5% aqueous solution of potassium hydroxide (an amount 2 times equimolar with respect to an amount of a catalyst) to terminate the reaction. The content of the unreacted phenol at the time when the condensation reaction was terminated was 4.8%. The temperature was increased to 180° C. under vacuum pressure (2.7 kPa) to distill the unreacted phenol and low boiling components out, thereby obtaining 880 g of a phenol-modified xylene formaldehyde resin having a viscosity at 25° C. of 7,400 mPa·S and a content of the unreacted phenol of 0.3%. A fraction collected by the distillation weighed 103 g.

Example 2

A 2-L separable flask equipped with a thermometer, a Liebig condenser, a stirrer, and a nitrogen introduction tube was added with 850 g of a xylene formaldehyde resin (NIKANOL (trade name) Y100, manufactured by mitsubishi Gas Chemical Company, Inc.) having a viscosity at 25° C. of 100 mPa·S, 150 g of phenol, 100 g of a liquid mixture of the unreacted phenol and unreacted low boiling components which had been collected by distillation in Example 1, and 2.6 ml of a 0.5% aqueous solution of para-toluene sulfonic acid (13 ppm with respect to a total amount of the xylene formaldehyde resin and phenol). Reaction was allowed to proceed for 2 hours at 165° C. under a nitrogen flow, and the viscosity at 25° C. of the reaction mixture was measured to be 450 mPa·S. The reaction mixture was added with 1.5 ml of a 0.5% aqueous solution of potassium hydroxide (an amount 2 times equimolar with respect to an amount of a catalyst) to terminate the reaction. The content of the unreacted phenol at the time when the condensation reaction was terminated was 4.5%. The temperature was increased to 180° C. under vacuum pressure (2.7 kPa) to distill the unreacted phenol and low boiling components out, thereby obtaining 890 g of a phenol-modified xylene formaldehyde resin having a viscosity at 25° C. of 3,800 mPa·S and a content of the unreacted phenol of 0.3%. A fraction collected by the distillation weighed 107 g.

Example 3

A 2-L separable flask equipped with a thermometer, a Liebig condenser, a stirrer, and a nitrogen introduction tube was added with 750 g of a xylene formaldehyde resin (NIKANOL (trade name) Y100, manufactured by mitsubishi Gas Chemical Company, Inc.) having a viscosity at 25° C. of 100 mPa·S, 250 g of phenol, 100 g of a liquid mixture of the unreacted phenol and unreacted low boiling components which had been collected by distillation in Example 2, and 6 ml of a 0.5% aqueous solution of para-toluene sulfonic acid (30 ppm with respect to a total amount of the xylene formaldehyde resin and phenol). Reaction was allowed to proceed for 1.5 hours at 165° C. under a nitrogen flow, and the viscosity at 25° C. of the reaction mixture was measured to be 750 mPa·S. The reaction mixture was added with 3.5 ml of a 0.5% aqueous solution of sodium hydroxide (an amount 2 times equimolar with respect to an amount of a catalyst) to terminate the reaction. The content of the unreacted phenol at the time when the condensation reaction was terminated was 4.9%. The temperature was increased to 180° C. under vacuum pressure (2.7 kPa) to distill the unreacted phenol and low boiling components out, thereby obtaining 880 g of a phenol-modified xylene formaldehyde resin having a viscosity at 25° C. of 7,800 mPa·S and a content of the unreacted phenol of 0.3%. A fraction collected by the distillation weighed 108 g.

Example 4

A 2-L separable flask equipped with a thermometer, a Liebig condenser, a stirrer, and a nitrogen introduction tube was added with 850 g of a mesitylene formaldehyde resin (NIKANOL (trade name) Y51, manufactured by Mitsubishi Gas Chemical Company, Inc.) having a viscosity at 25° C. of 50 mPa·S, 150 g of phenol, and 2.4 ml of a 0.5% aqueous solution of para-toluene sulfonic acid (12 ppm with respect to a total amount of the mesitylene formaldehyde resin and phenol). Reaction was allowed to proceed for 2 hours at 165° C. under a nitrogen flow, and the viscosity at 25° C. of the reaction mixture was measured to be 550 mPa·S. The reaction mixture was added with 1.4 ml of a 0.5% aqueous solution of potassium hydroxide (an amount 2 times equimolar with respect to an amount of a catalyst) to terminate the reaction. The content of the unreacted phenol at the time when the condensation reaction was terminated was 4.3%. The temperature was increased to 180° C. under vacuum pressure (2.7 kPa) to distill the unreacted phenol and low boiling components out, thereby obtaining 860 g of a phenol-modified mesitylene formaldehyde resin having a viscosity at 25° C. of 3,400 mPa·S and a content of the unreacted phenol of 0.3%. A fraction collected by the distillation weighed 103 g.

Example 5

A 2-L separable flask equipped with a thermometer, a Liebig condenser, a stirrer, and a nitrogen introduction tube was added with 800 g of a toluene formaldehyde resin (Epodil (registered trademark), manufactured by Air Products and Chemicals, Inc.) having a viscosity at 25° C. of 100 mPa·S, 200 g of phenol (special grade, manufactured by Wako Pure Chemical Industries, Ltd.), and 2 ml of a 5% aqueous solution of para-toluene sulfonic acid (special grade, manufactured by Wako Pure Chemical Industries, Ltd.) (100 ppm with respect to a total amount of the toluene formaldehyde resin and phenol). Reaction was allowed to proceed for 3 hours at 165° C. under a nitrogen flow, and the viscosity at 25° C. of the reaction mixture was measured to be 1,300 mPa·S. The reaction mixture was added with 1.2 ml of a 5% aqueous solution of potassium hydroxide (an amount 2 times equimolar with respect to an amount of a catalyst) to terminate the reaction. The content of the unreacted phenol at the time when the condensation reaction was terminated was 2.1%. The temperature was increased to 180° C. under vacuum pressure (2.7 kPa) to distill the unreacted phenol and low boiling components out, thereby obtaining 880 g of a phenol-modified toluene formaldehyde resin having a viscosity at 25° C. of 1,600 mPa·S and a content of the unreacted phenol of 0.3%. A fraction collected by the distillation weighed 105 g.

Comparative Example 1

A 2-L separable flask equipped with a thermometer, a Liebig condenser, a stirrer, and a nitrogen introduction tube was added with 850 g of a xylene formaldehyde resin (NIKANOL (trade name) Y100, manufactured by mitsubishi Gas Chemical Company, Inc.) having a viscosity at 25° C. of 100 mPa·S, 150 g of phenol, and 2 ml of a 5% aqueous solution of a pyridinium salt of para-toluene sulfonic acid (0.01% with respect to a total amount of the xylene formaldehyde resin and phenol). Reaction was allowed to proceed for 2 hours at 165° C. under a nitrogen flow, and no basic compound was added. The viscosity at 25° C. of the reaction mixture at the time when the reaction was terminated was measured to be 660 mPa·S. The temperature was increased to 180° C. under vacuum pressure (2.7 kPa) to distill the unreacted phenol and low boiling components out, thereby obtaining 880 g of a phenol-modified xylene formaldehyde resin having a viscosity at 25° C. of 14,000 mPa·S and a content of the unreacted phenol of 0.3%. A fraction collected by the distillation weighed 103 g.

Further, a 2-L separable flask equipped with a thermometer, a Liebig condenser, a stirrer, and a nitrogen introduction tube was added with 850 g of a xylene formaldehyde resin (NIKANOL (trade name) Y100, manufactured by Mitsubishi Gas Chemical Company, Inc.) having a viscosity at 25° C. of 100 mPa·S, 150 g of phenol, 100 g of a liquid mixture of the unreacted phenol and unreacted low boiling components which had been collected by distillation in Comparative Example 1, and 2.2 ml of a 5% aqueous solution of a pyridinium salt of para-toluene sulfonic acid (0.01% with respect to a total amount of the xylene formaldehyde resin and phenol). Reaction was allowed to proceed for 2 hours at 165° C. under a nitrogen flow, and the viscosity at 25° C. of the reaction mixture at this time was measured to be 110 mPa·S. A content of the unreacted phenol was measured to be 14%, so the reaction did not proceed.

INDUSTRIAL APPLICABILITY

According to the production method of the present invention, there can be obtained a low viscosity phenol-modified aromatic hydrocarbon formaldehyde resin which is kept in a liquid state and contains small amounts of unreacted phenols, and in which increase in viscosity is small even after removal of low boiling components. Further, the low viscosity aromatic hydrocarbon formaldehyde resin obtained by the production method of the present invention contains a phenolic hydroxyl group, has a low viscosity, has excellent compatibility with an epoxy resin, a curing agent thereof, and a urethane resin, and exhibits excellent anticorrosive property and excellent surface smoothness when used as an additive for an epoxy resin-based heavy duty coating.

The invention claimed is:

1. A method of producing a low viscosity liquid phenol-modified aromatic hydrocarbon formaldehyde resin, including subjecting an aromatic hydrocarbon formaldehyde resin (A) and a phenol (B), in which a weight ratio between the aromatic hydrocarbon formaldehyde resin (A): the phenol resin (B) is 90:10 to 70:30, to condensation reaction in the presence of an acid catalyst to obtain a low viscosity liquid phenol-modified aromatic hydrocarbon formaldehyde resin (C) having a viscosity at 25° C. of 1,500 to 10,000 mPa·S, wherein the acid catalyst comprises para-toluene sulfonic acid; wherein the aromatic hydrocarbon formaldehyde resin (A) comprises a xylene formaldehyde resin or a mesitylene formaldehyde resin and the viscosity of the aromatic hydrocarbon formaldehyde resin (A) at 25° C. is 30 to 500 mPa·S; and wherein the acid catalyst is added in an amount of 5 to 50 ppm with respect to a total amount of the aromatic hydrocarbon formaldehyde resin (A) and the phenol (B), the method also comprising:
    terminating, when a reaction mixture has a viscosity at 25° C. of 400 to 1000 mPa·S, the condensation reaction by adding an inorganic basic compound and/or a tertiary amine compound having a boiling point of 300° C. or more;
    distilling and removing the phenol (B) unreacted and a low boiling component after termination of the condensation reaction, such that the low viscosity liquid phenol-modified aromatic hydrocarbon formaldehyde resin (C) comprises the unreacted phenol (B) in a content of 0.5% by weight or less; and
    reusing unreacted phenol (B) and the low boiling component, distilled and removed after termination of the condensation reaction, as a part of a reaction raw material.

2. The method of producing a low viscosity liquid phenol-modified aromatic hydrocarbon formaldehyde resin according to claim 1, wherein the inorganic basic compound comprises at least one kind selected from the group consisting of sodium hydroxide, sodium carbonate, potassium hydroxide, and calcium hydroxide.

3. The method of producing a low viscosity liquid phenol-modified aromatic hydrocarbon formaldehyde resin according to claim 1, wherein the tertiary amine compound having a boiling point of 300° C. or more comprises triethanolamine.

4. The method of producing a low viscosity liquid phenol-modified aromatic hydrocarbon formaldehyde resin according to claim 1, wherein the condensation reaction is performed at a reaction temperature of 120 to 200° C. for 1 to 6 hours.

5. The method of producing a low viscosity liquid phenol-modified aromatic hydrocarbon formaldehyde resin according to claim 1, wherein the phenol (B) is at least one selected from the group consisting of phenol, cresols, xylenols, butylphenol, octylphenol, nonylphenol, cardanol and terpene phenol.

6. The method of producing a low viscosity liquid phenol-modified aromatic hydrocarbon formaldehyde resin according to claim 5, wherein the phenol (B) is phenol.

7. The method of producing a low viscosity liquid phenol-modified aromatic hydrocarbon formaldehyde resin according to claim 1, wherein the amount of the acid catalyst added is 10 to 30 ppm with respect to a total amount of the aromatic hydrocarbon formaldehyde resin (A) and the phenol (B).

8. The method of producing a low viscosity liquid phenol-modified aromatic hydrocarbon formaldehyde resin according to claim 1, wherein said viscosity of the aromatic hydrocarbon formaldehyde resin (A) at 25° C. is 50 to 200 mPa·S.

* * * * *